United States Patent
Lesner

(10) Patent No.: US 10,635,181 B2
(45) Date of Patent: *Apr. 28, 2020

(54) REMOTE CONTROL OF A DESKTOP APPLICATION VIA A MOBILE DEVICE

(71) Applicant: INTUIT INC., Mountain View, CA (US)

(72) Inventor: Christopher Z. Lesner, Mountain View, CA (US)

(73) Assignee: Intuit, Inc., Mountain View, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 16/035,347

(22) Filed: Jul. 13, 2018

(65) Prior Publication Data

US 2018/0321755 A1 Nov. 8, 2018

Related U.S. Application Data

(63) Continuation of application No. 14/072,560, filed on Nov. 5, 2013, now Pat. No. 10,048,762.

(51) Int. Cl.
| | |
|---|---|
| G06F 3/01 | (2006.01) |
| H04L 29/08 | (2006.01) |
| H04L 29/06 | (2006.01) |
| G06F 3/03 | (2006.01) |
| G06F 3/048 | (2013.01) |

(52) U.S. Cl.
CPC .............. *G06F 3/017* (2013.01); *G06F 3/013* (2013.01); *G06F 3/0304* (2013.01); *G06F 3/048* (2013.01); *H04L 67/025* (2013.01); *H04L 67/38* (2013.01)

(58) Field of Classification Search
None
See application file for complete search history.

(56) References Cited

U.S. PATENT DOCUMENTS

| | | | |
|---|---|---|---|
| 8,225,343 B2 | 7/2012 | Miller, IV | |
| 8,560,004 B1 | 10/2013 | Tsvetkov et al. | |
| 8,836,768 B1* | 9/2014 | Rafii | G06F 3/017 |
| | | | 345/420 |
| 9,223,415 B1* | 12/2015 | Zhou | G06K 9/00335 |
| 9,400,553 B2* | 7/2016 | Kerr | G06F 3/013 |

(Continued)

FOREIGN PATENT DOCUMENTS

| | | |
|---|---|---|
| JP | 2013141327 A | 7/2013 |
| KR | 20120061169 A | 6/2012 |

*Primary Examiner* — Beau D Spratt
(74) *Attorney, Agent, or Firm* — Patterson + Sheridan LLP

(57) ABSTRACT

One embodiment of the present invention provides a system for using a mobile device to remotely control a desktop application that was configured for use with a pointing device. During operation, the system receives at a mobile device, from a user, a connection request to connect to a desktop application executing on a remote device. In response to the connection request, the system establishes a remote control session between the mobile device and the remote device. Next, the system receives, at the mobile device, a video stream from a first camera coupled to the mobile device. The system then analyzes the video stream, at the mobile device, to identify a gesture made by the user. Next, the system identifies, at the mobile device, a pointing device command corresponding to the gesture. Finally, the system sends the pointing device command to the desktop application executing on the remote device.

17 Claims, 4 Drawing Sheets

(56) References Cited

U.S. PATENT DOCUMENTS

| | | |
|---|---|---|
| 2004/0119662 A1 | 6/2004 | Dempski |
| 2008/0273755 A1 | 11/2008 | Hildreth |
| 2009/0153288 A1 | 6/2009 | Hope et al. |
| 2010/0053151 A1 | 3/2010 | Marti et al. |
| 2012/0081282 A1 | 4/2012 | Chin |
| 2012/0313900 A1 | 12/2012 | Dahl |
| 2013/0204408 A1 | 8/2013 | Thiruvengada et al. |
| 2013/0263287 A1 | 10/2013 | Ayyalasomayajula et al. |
| 2013/0271372 A1 | 10/2013 | Nasiri et al. |
| 2014/0009396 A1 | 1/2014 | Clausen |
| 2014/0028572 A1 | 1/2014 | St. Clair |
| 2014/0245230 A1 | 8/2014 | Durham et al. |
| 2014/0258942 A1* | 9/2014 | Kutliroff ............... G06F 3/013 715/863 |
| 2014/0267049 A1 | 9/2014 | Durham et al. |
| 2014/0267084 A1 | 9/2014 | Krulce et al. |
| 2014/0267094 A1 | 9/2014 | Hwang et al. |
| 2014/0291396 A1 | 10/2014 | Molisimo et al. |
| 2015/0089381 A1 | 3/2015 | Shao |

\* cited by examiner

REMOTE CONTROL OF A DESKTOP APPLICATION VIA A MOBILE DEVICE

CROSS-REFERENCE TO RELATED APPLICATIONS

This application is a continuation of co-pending U.S. patent application Ser. No. 14/072,560, entitled "Remote Control of a Desktop Application via a Mobile Device" filed on Nov. 5, 2013, which is incorporated herein by reference in its entirety.

BACKGROUND

The ubiquity of high speed, low latency cellular data plans makes remote control of desktop applications via mobile devices a feasible reality. However, user desktop interfaces designed for navigation using a high resolution pointer, such as a track pad or mouse, are very cumbersome to manipulate via a mobile device. Newer mobile devices typically have high-resolution touch screen displays, many of which match or surpass the resolution of their desktop counterparts. The problem therein is that human fingers are not getting smaller. Fingers in front of the screen block the view of the screen and obscure what users are trying to touch. Additionally, finger grime can dirty the screen and cause scratching. These problems are magnified when trying to remotely control desktop applications from mobile devices, using various remote protocols such as Remote Desktop and VNC.

BRIEF SUMMARY

One embodiment of the present invention provides a system for using a mobile device to remotely control a desktop application that was configured for use with a pointing device. During operation, the system receives at a mobile device, from a user, a connection request to connect to a desktop application executing on a remote device. In response to the connection request, the system establishes a remote control session between the mobile device and the remote device. Next, the system receives, at the mobile device, a video stream from a first camera coupled to the mobile device. The system then analyzes the video stream, at the mobile device, to identify a gesture made by the user. Next, the system identifies, at the mobile device, a pointing device command corresponding to the gesture. Finally, the system sends the pointing device command to the desktop application executing on the remote device.

In some embodiments of the present invention, the system receives, at the mobile device, a second video stream from a second camera coupled to the mobile device. Next, the system analyzes the second video stream to identify a second gesture made by the user. The system then identifies a second pointing device command corresponding to the second gesture. Finally, the system sends the second pointing device command to the desktop application executing on the remote device.

In some embodiments of the present invention, the second camera is coupled to a same side of the mobile device as a main display.

In some embodiments of the present invention, identifying the second gesture involves identifying a motion of one of an eye or an eyelid.

In some embodiments of the present invention, the first camera is coupled to an opposite side of the mobile device from a main display.

In some embodiments of the present invention, identifying the gesture involves identifying a motion of a hand.

In some embodiments of the present invention, identifying the gesture involves identifying a motion of a marker.

In some embodiments of the present invention, analyzing the video stream involves using hardware within the mobile device that is optimized for determining motion vectors.

In some embodiments of the present invention, the system receives a selection from the user of an object in the video stream. The system then uses a focus lock feature of the mobile device to focus on the object.

In some embodiments of the present invention, the system uses an accelerometer coupled to the mobile device to compensate for a motion of the mobile device while the video stream is being received.

In some embodiments of the present invention, the mobile device is a wearable device.

DETAILED DESCRIPTION

Figure 1:
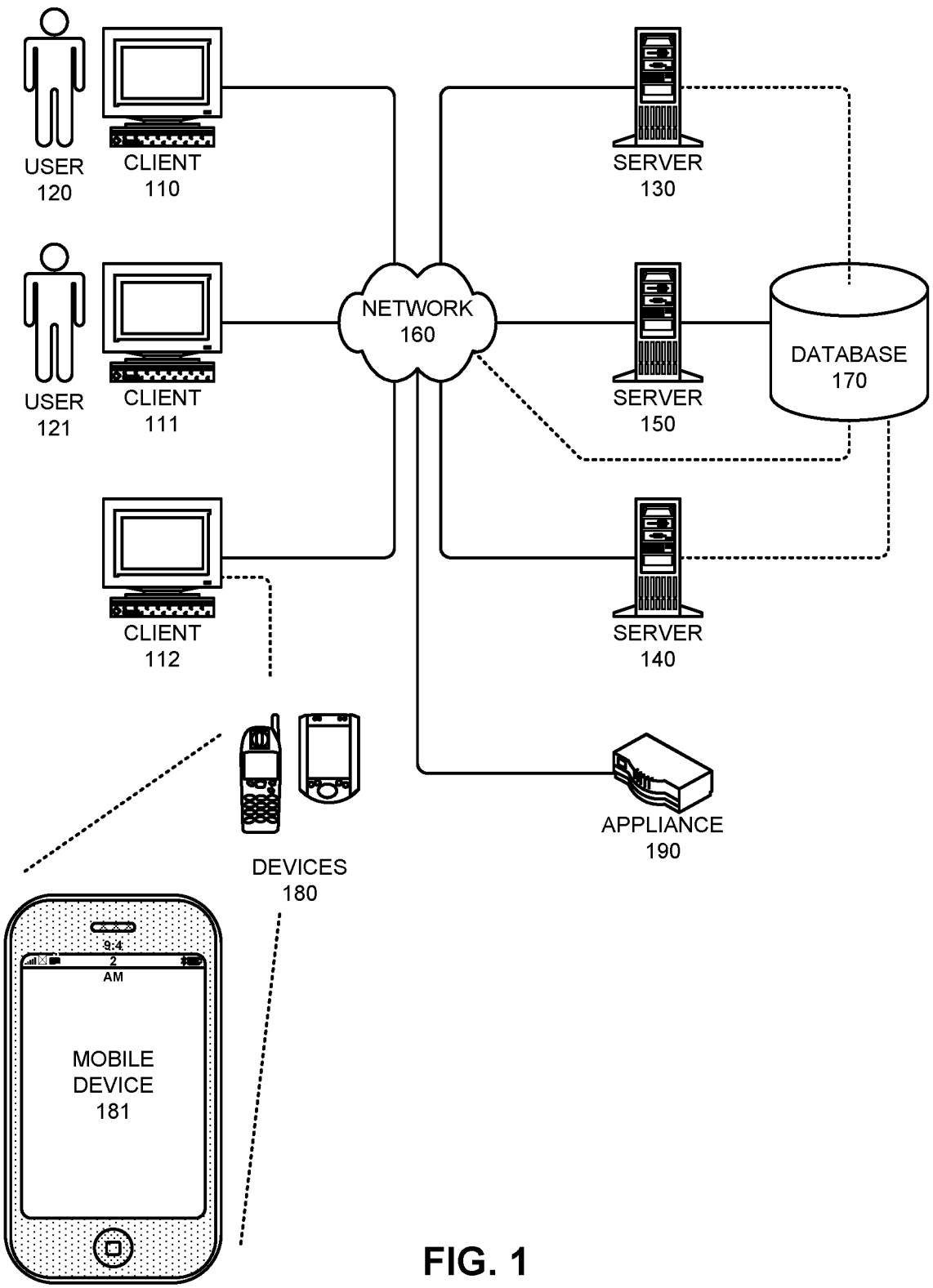
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. Note that the term "non-transitory computer-readable storage medium" comprises all computer-readable media, with the sole exception of a propagating electromagnetic signal.

The methods and processes described in the detailed description section can be embodied as code and/or data, which can be stored on a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention provides a system for using a mobile device to remotely control a desktop application that was configured for use with a pointing device. During operation, the system receives at a mobile device, from a user, a connection request to connect to a desktop application executing on a remote device. For example, the user may be connecting to her desktop computer from her mobile smartphone via the Virtual Network Computing (VNC) protocol. In response to the connection request, the system establishes a remote control session between the mobile device and the remote device.

Next, the system receives, at the mobile device, a video stream from a first camera coupled to the mobile device. Note that a majority of modern smartphones incorporate at least a rear-facing camera for picture and video recording; and many also include a front-facing camera for video conferencing. The system then analyzes the video stream, at the mobile device, to identify a gesture made by the user. For example, this gesture could be a simple hand movement or a finger movement. Next, the system identifies, at the mobile device, a pointing device command corresponding to the gesture. This command can comprise any command made with a traditional high-resolution pointing device, such as a mouse, track pad, or track ball, including: moving a cursor, making a selection, scrolling a window, etc. Finally, the system sends the pointing device command to the desktop application executing on the remote device.

In some embodiments of the present invention, the system receives, at the mobile device, a second video stream from a second camera coupled to the mobile device. As mentioned previously, many modern smartphones incorporate two cameras, one on the front and one on the back of the device. Next, the system analyzes the second video stream to identify a second gesture made by the user. The system then identifies a second pointing device command corresponding to the second gesture. Finally, the system sends the second pointing device command to the desktop application executing on the remote device.

In some embodiments of the present invention, identifying the second gesture involves identifying a motion of one of an eye or an eyelid. For example, the system may use the first camera, which is coupled to the opposite side of the mobile device from the main display, to track the user's hand motions to move the cursor on the remote device while simultaneously using the second camera, which is coupled to the same side of the mobile device as the main display, to track the user's eyelids for blinking to indicate right and left mouse clicks.

In some embodiments of the present invention, identifying the gesture involves identifying a motion of a hand, while in some embodiments of the present invention, identifying the gesture involves identifying a motion of a marker. Note that the marker may be any type of object that is easily recognized by the system. In some embodiments, the marker includes physical markings to aid in identification of the marker.

In some embodiments of the present invention, analyzing the video stream involves using hardware within the mobile device that is optimized for determining motion vectors. Note that many modern smartphones have specialized hardware for video encoding that is efficient at determining motion vectors. For example, many modern smartphones incorporate video encoding hardware, such as dedicated H.264 encoding chips, as well as hardware optimized for handling software encoding routines. Newer smartphones even have the encoding hardware incorporated directly into the CPU or GPU. These encoding mechanisms typically operate by quickly determining motion vectors from one frame to the next. Embodiments of the present invention may leverage this hardware to implement the system with minimal impact on system resources, including processor cycles and battery power.

In some embodiments of the present invention, the system receives a selection from the user of an object in the video stream. The system then uses a focus lock feature of the mobile device to focus on the object. Many smartphones include focus lock features that are hardware and/or software enabled to aid in taking photographs and videos. Embodiments of the present invention can leverage this focus lock feature to aid in analyzing the gestures.

In some embodiments of the present invention, the system uses an accelerometer coupled to the mobile device to compensate for a motion of the mobile device while the video stream is being received. Most modern smartphones and mobile devices include a number of accelerometers for various functions. Embodiments of the present invention may leverage these accelerometers to negate the motion introduced into the video stream caused by moving the mobile device.

In some embodiments of the present invention, the mobile device is a wearable device. For example, a pair of glasses with at least one camera and an embedded screen may be used with embodiments of the present invention.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, personal digital assistants (PDAs), smartphones, personal music players (such as MP3 players), gaming systems, digital cameras, video cameras, portable storage media, or any other device that can be coupled to the client. Note that, in some embodiments of the present invention, devices 180 can be coupled directly to network 160 and can function in the same manner as clients 110-112. In order to work properly with embodiments of the present invention, devices 180 must comprise some sort of imaging device or sensor, such as a camera. Mobile device 181, which is part of devices 180, features a rear-facing camera and a front-facing camera.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100. In general, any device that is capable of communicating via network 160 may incorporate elements of the present invention.

System

Figure 2:
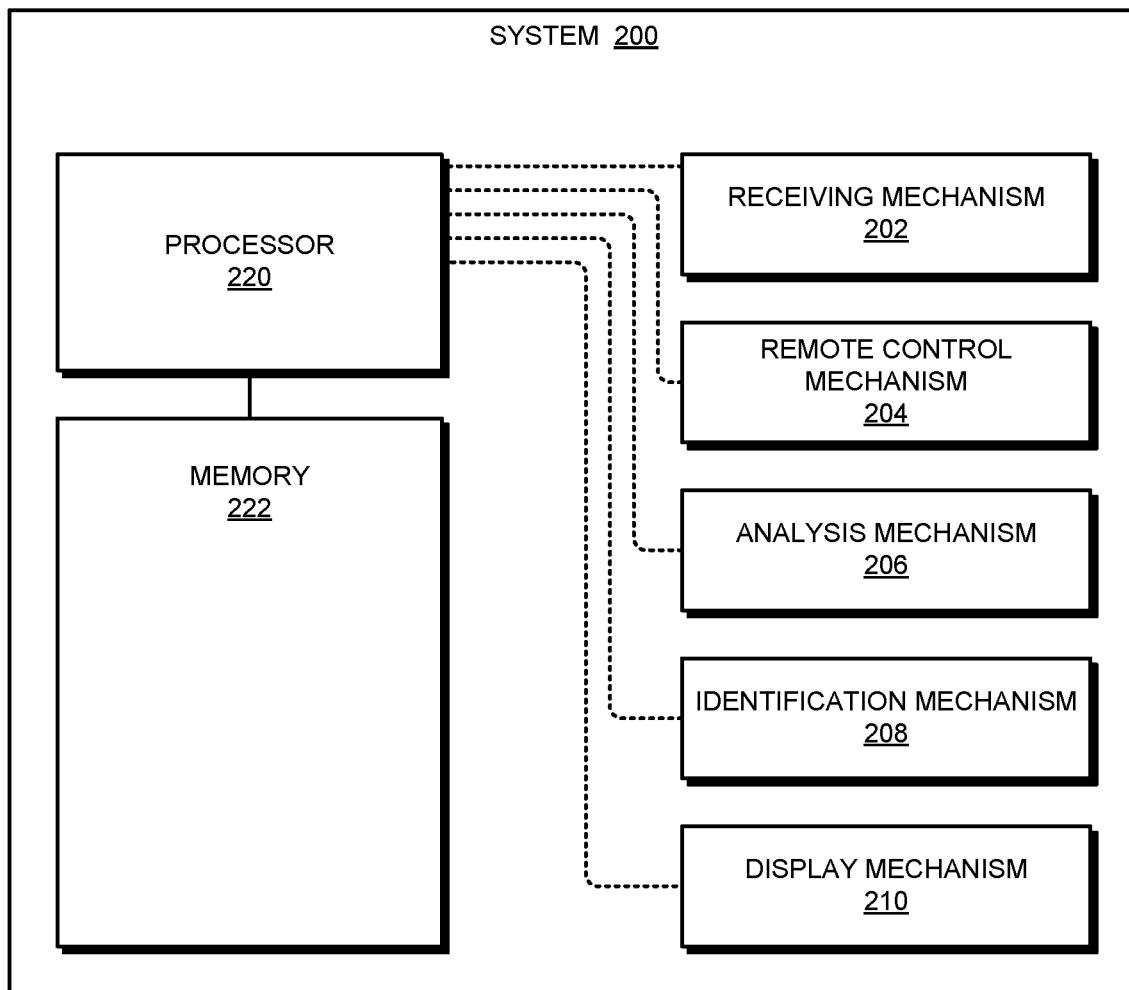
FIG. 2 illustrates a system in accordance with an embodiment of the present invention.

FIG. 2 illustrates a system 200 in accordance with an embodiment of the present invention. As illustrated in FIG. 2, system 200 can comprise server 150, database 170, appliance 190, client 110, devices 180, or any combination thereof. System 200 can also include receiving mechanism 202, remote control mechanism 204, analysis mechanism 206, identification mechanism 208, display mechanism 210, processor 220, and memory 222.

Remotely Controlling a Desktop Application

Figure 3:
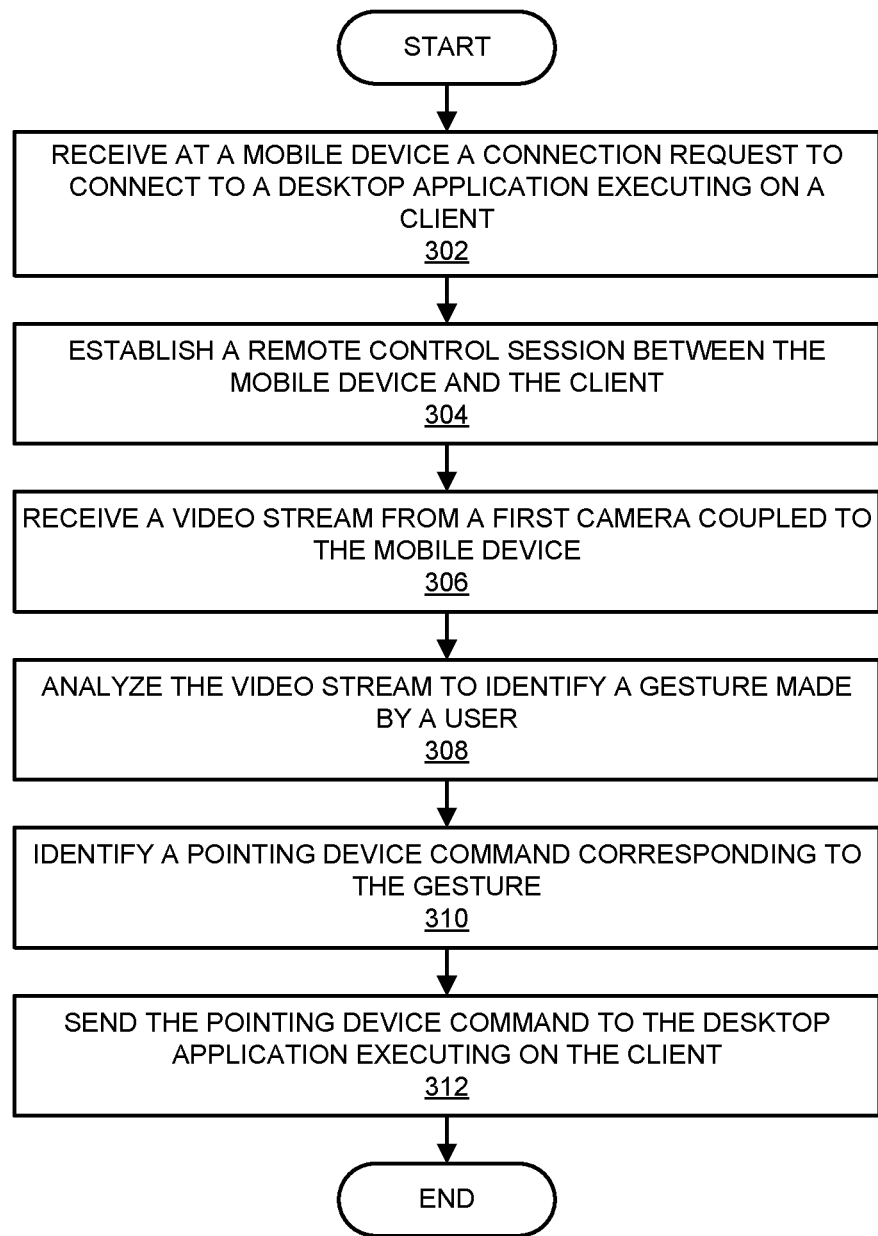
FIG. 3 presents a flow chart illustrating the process of remotely controlling a desktop application via a mobile device in accordance with an embodiment of the present invention.

FIG. 3 presents a flow chart illustrating the process of remotely controlling a desktop application via a mobile device in accordance with an embodiment of the present invention. During operation, receiving mechanism 202 receives at mobile device 181, from user 120, a connection request to connect to a desktop application executing on client 110 (operation 302). In response to the connection request, remote control mechanism 204 establishes a remote control session between mobile device 181 and client 110 (operation 304). Next, receiving mechanism 202 receives a video stream from a first camera coupled to mobile device 181 (operation 306). Analysis mechanism 206 then analyzes the video stream to identify a gesture made by user 120 (operation 308). Next, identification mechanism 208 identifies a pointing device command corresponding to the gesture (operation 310). Finally, remote control mechanism 204 sends the pointing device command to the desktop application executing on client 110 (operation 312).

Advanced Remote Control of a Desktop Application

Figure 4:
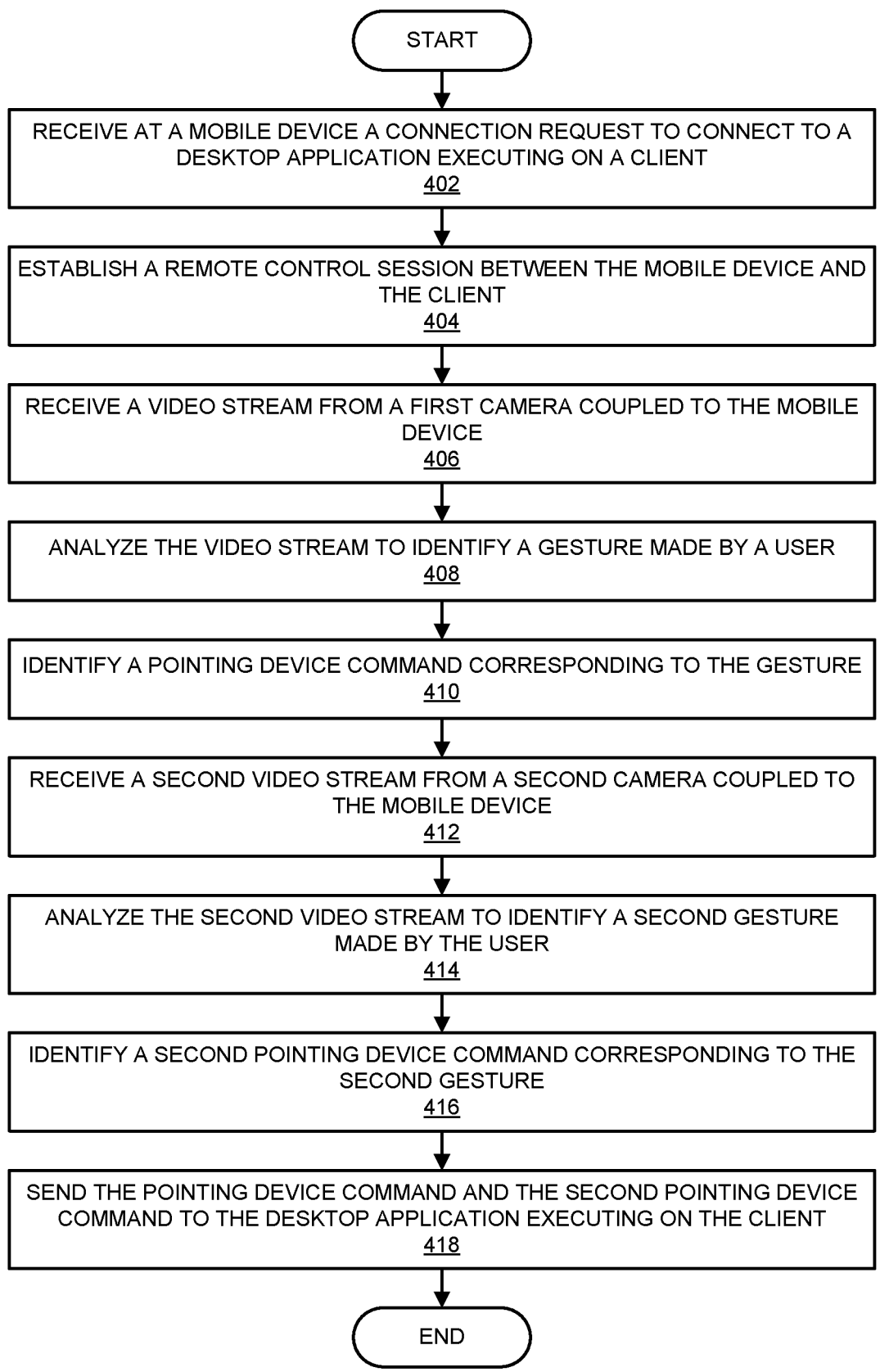
FIG. 4 presents a flow chart illustrating the process of remotely controlling a desktop application via a mobile device with two cameras in accordance with an embodiment of the present invention.

FIG. 4 presents a flow chart illustrating the process of remotely controlling a desktop application via a mobile device with two cameras in accordance with an embodiment of the present invention. During operation, receiving mechanism 202 receives at mobile device 181, from user 120, a connection request to connect to a desktop application executing on client 110 (operation 402). In response to the connection request, remote control mechanism 204 establishes a remote control session between mobile device 181 and client 110 (operation 404). Next, receiving mechanism 202 receives a video stream from a first camera coupled to mobile device 181 (operation 406). Analysis mechanism 206 then analyzes the video stream to identify a gesture made by user 120 (operation 408). Next, identification mechanism 208 identifies a pointing device command corresponding to the gesture (operation 410). Receiving mechanism 202 also receives a second video stream from a second camera coupled to mobile device 181 (operation 412). Analysis mechanism 206 then analyzes the second video stream to identify a second gesture made by user 120 (operation 414). Next, identification mechanism 208 identifies a second pointing device command corresponding to the second gesture (operation 416). Finally, remote control mechanism 204 sends the pointing device command and the second pointing device command to the desktop application executing on client 110 (operation 418).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A wearable device configured to control a remote computing device, comprising:
   a memory comprising executable instructions;
   a chip configured for determining motion vectors;
   a screen;
   a network interface;
   a first camera coupled to a first side of the wearable device opposite from a second side of the wearable device comprising the screen;
   a second camera coupled to the second side of the wearable device; and
   a processor in data communication with the memory, the processor configured to execute the executable instructions and cause the wearable device to perform a method for controlling a remote computing device, the method comprising:
  establishing, via the network interface and a bidirectional data protocol, a remote control session between the wearable device, a server and the remote computing device running an application;
  receiving, via the first camera, a first video stream;
  analyzing, by the chip configured for determining motion vectors, the first video stream in order to identify a first gesture made by a first object within the first video stream;
  identifying, by the processor, a pointing device command corresponding to the first gesture;
  receiving, via the second camera, a second video stream;
  analyzing, by the chip configured for determining motion vectors, the second video stream to determine a second gesture corresponding to motion of a second object within the second video stream;
  identifying, by the processor, a selection command corresponding to the second gesture; and
  sending, from the wearable device through the server to the remote computing device via the network interface and the bidirectional data protocol, the pointing device command and the selection command, wherein the pointing device command is configured to cause a cursor to move within the application running on the remote computing device.

2. The wearable device of claim 1, further comprising: an accelerometer,
  wherein the method further comprises: compensating for motion of the wearable device while receiving the first video stream based on acceleration data from the accelerometer.

3. The wearable device of claim 1, wherein the second object is one of an eye or an eyelid of a user operating the wearable device.

4. The wearable device of claim 1, wherein the wearable device is a pair of glasses, and wherein the screen is embedded in the pair of glasses.

5. The wearable device of claim 1, wherein the bidirectional data protocol comprises a Remote Desktop Protocol.

6. The wearable device of claim 1, wherein the bidirectional data protocol comprises a VNC protocol.

7. A method for using a wearable device to control a remote computing device:
  establishing, at a wearable device using a bidirectional data protocol, a remote control session between the wearable device, a server and a remote computing device running an application;
  receiving, at the wearable device, a first video stream from a first camera coupled to the wearable device, the first camera being coupled to a first side of the wearable device opposite from a second side of the wearable device comprising a screen of the wearable device;
  analyzing, at the wearable device using hardware configured for determining motion vectors, the first video stream in order to identify a first gesture made by a first object within the first video stream;
  identifying, at the wearable device, a pointing device command corresponding to the first gesture; and
  receiving, at the wearable device, a second video stream from a second camera coupled to the second side of the wearable device;
  analyzing, at the wearable device using the hardware configured for determining motion vectors, the second video stream to determine a second gesture corresponding to motion of a second object within the second video stream;
  identifying, at the wearable device, a selection command corresponding to the second gesture; and
  sending, from the wearable device through the server to the remote computing device, the pointing device command and the selection command, wherein the pointing device command being configured to cause a cursor to move within the application running on the remote computing device.

8. The method of claim 7, further comprising: using an accelerometer coupled to the wearable device to compensate for motion of the wearable device while receiving the first video stream.

9. The method of claim 7, wherein the second object is one of an eye or an eyelid of a user operating the wearable device.

10. The method of claim 7, wherein the wearable device is a pair of glasses, and wherein the screen is embedded in the pair of glasses.

11. The method of claim 7, wherein the bidirectional data protocol comprises a Remote Desktop Protocol.

12. The method device of claim 7, wherein the bidirectional data protocol comprises a VNC protocol.

13. A non-transitory computer-readable medium comprising executable instructions that when executed by a processor within a wearable device, cause the wearable device to perform a method for using the wearable device to control a remote computing device, the method comprising:
  establishing, at the wearable device using a bidirectional data protocol, a remote control session between the wearable device, a server and a remote computing device; running an application;
  receiving, at the wearable device, a first video stream from a first camera coupled to the wearable device, the first camera being coupled to a first side of the wearable device opposite from a second side of the wearable device comprising a screen of the wearable device;
  analyzing, at the wearable device using hardware configured for determining motion vectors, the first video stream in order to identify a first gesture made by a first object within the first video stream;
  identifying, at the wearable device, a pointing device command corresponding to the first gesture; and
  receiving, at the wearable device, a second video stream from a second camera coupled to the second side of the wearable device;
  analyzing, at the wearable device using the hardware configured for determining motion vectors, the second video stream to determine a second gesture corresponding to motion of a second object within the second video stream;
  identifying, at the wearable device, a selection command corresponding to the second gesture; and
  sending, from the wearable device through the server to the remote computing device, the pointing device command and the selection command, wherein the pointing device command is configured to cause a cursor to move within the application running on the remote computing device.

14. The non-transitory computer-readable medium of claim 13, wherein the method further comprises: using an accelerometer coupled to the wearable device to compensate for motion of the wearable device while receiving the first video stream.

15. The non-transitory computer-readable medium of claim 13, wherein the wearable device is a pair of glasses, and wherein the screen is embedded in the pair of glasses.

16. The non-transitory computer-readable medium of claim 13, wherein the second object is one of an eye or an eyelid of a user operating the wearable device.

17. The non-transitory computer-readable medium of claim 13, wherein the bidirectional data protocol comprises one of a Remote Desktop Protocol or a VNC protocol.

\* \* \* \* \*